United States Patent
Van Happen et al.

(10) Patent No.: US 12,070,040 B2
(45) Date of Patent: Aug. 27, 2024

(54) METHOD AND SYSTEM FOR DEBONING OF A CARCASS LEG PART OF A FOUR-LEGGED SLAUGHTER ANIMAL, FOR REMOVING MEAT FROM A BONE OF THE CARCASS LEG PART

(71) Applicant: MAREL MEAT B.V., Boxmeer (NL)

(72) Inventors: Frank Van Happen, Boxmeer (NL); Jan Meerdink, Boxmeer (NL); Franciscus Theodorus Henricus Johannes Van Der Steen, Boxmeer (NL)

(73) Assignee: MAREL MEAT B.V., Boxmeer (NL)

( * ) Notice: Subject to any disclaimer, the term of this patent is extended or adjusted under 35 U.S.C. 154(b) by 0 days.

(21) Appl. No.: 18/021,478

(22) PCT Filed: Aug. 16, 2021

(86) PCT No.: PCT/EP2021/072733
§ 371 (c)(1),
(2) Date: Feb. 15, 2023

(87) PCT Pub. No.: WO2022/043114
PCT Pub. Date: Mar. 3, 2022

(65) Prior Publication Data
US 2023/0329251 A1 Oct. 19, 2023

(30) Foreign Application Priority Data
Aug. 31, 2020 (EP) .................................... 20193568

(51) Int. Cl.
*A22C 17/00* (2006.01)
*A22C 17/02* (2006.01)

(52) U.S. Cl.
CPC ........ *A22C 17/004* (2013.01); *A22C 17/0093* (2013.01); *A22C 17/02* (2013.01)

(58) Field of Classification Search
CPC .... A22C 17/004; A22C 17/0093; A22C 17/02
(Continued)

(56) References Cited

U.S. PATENT DOCUMENTS

| | | | |
|---|---|---|---|
| 4,811,456 A | | 3/1989 | Heuvel |
| 4,811,457 A | * | 3/1989 | Lindert .................. A22C 17/02 452/136 |

(Continued)

FOREIGN PATENT DOCUMENTS

| | | |
|---|---|---|
| CN | 1031013 A | 2/1989 |
| CN | 102711488 A | 10/2012 |

(Continued)

OTHER PUBLICATIONS

International Search Report from PCT Application No. PCT/EP2021/072733, Dec. 8, 2021.

(Continued)

*Primary Examiner* — Richard T Price, Jr.
(74) *Attorney, Agent, or Firm* — Workman Nydegger

(57) ABSTRACT

A method and system of removing meat from a bone of a carcass leg part, includes the subsequent steps of: a) holding, by a support device, of the leg part, b) moving a meat removing device: into a pre-cut, c) then away from the support device along the bone to a first end position so that meat is removed from the bone, d) then away from the bone, forcing meat away from the bone and severing further meat from the bone, e) then towards the support device, f) and then towards the bone, g) and then again away from the support device along the bone to a second end position distanced further from the support device than the first end position so that further meat is removed from the bone.

15 Claims, 11 Drawing Sheets

(58) Field of Classification Search
USPC .......................................................... 452/135
See application file for complete search history.

(56) References Cited

U.S. PATENT DOCUMENTS

| | | | |
|---|---|---|---|
| 4,918,788 A | | 4/1990 | Passchier |
| 4,993,113 A | * | 2/1991 | Hazenbroek ....... A22C 21/0076 |
| | | | 452/167 |
| 5,001,812 A | * | 3/1991 | Hazenbroek ........... A22C 17/04 |
| | | | 452/149 |
| 5,401,210 A | * | 3/1995 | Manmoto .......... A22C 21/0076 |
| | | | 452/136 |
| 8,500,522 B2 | | 8/2013 | Drabbels et al. |
| 9,795,149 B2 | * | 10/2017 | Ebbers ............... A22C 21/0076 |
| 2008/0020693 A1 | * | 1/2008 | Toyoshima ........ A22C 21/0076 |
| | | | 452/135 |
| 2012/0190284 A1 | | 7/2012 | Hazenbroek et al. |
| 2017/0006883 A1 | | 1/2017 | Ebbers et al. |

FOREIGN PATENT DOCUMENTS

| | | |
|---|---|---|
| EP | 0439780 A1 | 8/1991 |
| EP | 0442554 B1 | 1/1994 |
| EP | 0898894 A2 | 3/1999 |
| EP | 1053684 A1 | 11/2000 |
| EP | 0763326 B1 | 7/2002 |
| EP | 0898894 B1 | 5/2003 |
| EP | 1164857 B1 | 8/2004 |
| EP | 1591015 A1 | 11/2005 |
| EP | 1639898 A1 | 3/2006 |
| EP | 1441594 B1 | 10/2008 |
| EP | 1945037 B1 | 9/2009 |
| EP | 2110021 A1 | 10/2009 |
| EP | 2153727 A1 | 2/2010 |
| EP | 2277382 A1 | 1/2011 |
| EP | 2277384 A1 | 1/2011 |
| EP | 2912947 A1 | 9/2015 |
| EP | 3120706 A1 | 1/2017 |
| WO | 2007055571 A2 | 5/2007 |
| WO | 2012102609 A1 | 8/2012 |
| WO | 2015117668 A1 | 8/2015 |

OTHER PUBLICATIONS

Extended European Search Report from European Application No. 20193568.1, Feb. 9, 2021.
Chinese Office Action from corresponding CN Application No. 202180052879.2, May 9, 2024.

* cited by examiner

METHOD AND SYSTEM FOR DEBONING OF A CARCASS LEG PART OF A FOUR-LEGGED SLAUGHTER ANIMAL, FOR REMOVING MEAT FROM A BONE OF THE CARCASS LEG PART

TECHNICAL FIELD

The invention relates to a method of deboning of a carcass leg part of a four-legged slaughter animal, for removing meat from a bone of the carcass leg part. The invention also relates to a system for deboning a carcass leg part of a four-legged slaughter animal, for removing meat from a bone of the carcass leg part.

BACKGROUND

EP 898 894 A2 relates to a semiautomatic pig thigh deboner and deboning process.

EP 2 110 021 A1 relates to a method and apparatus for deboning an arm or leg part of a slaughtered domestic animal, in particular a pig leg part.

SUMMARY

It is an object of the present invention to provide an improved system and method for deboning a carcass leg part.

It is a further object of the present invention to provide a system and method for deboning a carcass leg part which has improved ergonomics for an operator of the system which system has an improved efficiency.

In a first aspect, the present invention provides a method of deboning of a carcass leg part of a four-legged slaughter animal, for removing meat from a bone of the carcass leg part.

The method comprising the subsequent steps of:
a) holding, by a support device, of the leg part by the lower end of the bone, or by a still lower part of the leg such as a foot,
b) moving a meat removing device into a pre-cut, towards the bone, to a first starting position of the meat removing device, which pre-cut is a cut made along the circumference of the bone at, or at least near, a lower end of the bone so as to sever muscle fibers,
c) executing by means of the meat removing device a first meat removing movement from the first starting position in a meat removing direction away from the support device along the bone to a first end position so that meat is removed from the bone,
d) moving the meat removing device away from the bone, wherein meat which is in contact with the meat removing device is forced away from the bone and severs further meat from the bone,
e) moving the meat removing device in a reposition direction towards the support device,
f) moving the meat removing device towards the bone to a second starting position,
g) executing by means of the meat removing device a second meat removing movement from the second starting position in the meat removing direction away from the support device along the bone to a second end position distanced further from the support device than the first end position so that further meat is removed from the bone.

An effect of the method according to the present invention is that because of the execution of the specific subsequent method steps of the method according to the invention, a very efficient and robust carcass leg part deboning method has been provided. The deboning process, i.e. at least steps b) to g), take place in an automated manner, leading to a very operator-friendly process. The subdivision of the deboning of the leg part in successive iterations leads to a more robust process of deboning in which meat is removed reliably and efficiently from the bone. The moving away from the bone of the meat removing device after a meat removing movement may contribute in the effective severing of meat from the bone. By said successive cycles, or, iterations comprising a movement in the meat removing direction and the subsequent moving away from the bone, muscle membranes are gradually severed from the bone, preventing or at least significantly reducing rupture, which contributes to a significantly more effective removing of meat from the bone. This way, one or more of the above objects has been achieved.

In an embodiment of the method and system according to the invention, the carcass leg part is of a porcine, bovine, caprine, ovine or camelid slaughter animal. The mentioned effects of the present invention are most prominent in an embodiment, for deboning a pork carcass leg part, wherein the bone is a femur, humerus, aitch bone or shank, preferably a femur or humerus bone. In particular the humerus and femur bones have a relatively irregular profile which makes the deboning process, in particular manual deboning, complex.

For the purpose of step a), the leg may be suspended by the lower end of the bone, or by a still lower part of the leg such as a foot, from the support device. The support device may be a part of an overhead transport system or a part connected to a carrousel. In particular, in case of a humerus or femur bone the bone is held, preferably suspended, by the lower end of the bone. This way, any forces exerted on the bone while deboning are transferred within the bone itself and are not transferred through any joint.

In an embodiment, the method comprises, prior to step b), preferably prior to step a), making the pre-cut along the circumference of the bone at, or at least near, a lower end of the bone, so as to sever muscle fibers. The system according to the invention may be provided in or along a processing line also having an upstream cutting station having a cutter for making said pre-cut in an automated manner.

For the purpose of step c), the first meat removing movement in the meat removing direction away from the support device may follow a straight path, preferably downwards, away from the support device. The carcass leg may be held by the support device in such a manner that the bone may move, such as pivot, or swing in case that the bone would be suspended, with respect to the support device. The support device is preferably arranged to at least block a translation movement of the bone in the meat removing direction away from the support.

In an embodiment, during at least a part of step d), a force in the meat removing direction is exerted on the meat by the meat removing device. An effect of still exerting said force on the meat during at least a part of the movement of the meat removing device away from the bone is that the severing and removal of the meat from the bone is further improved. For this purpose, during step d), the movement of the meat removing device may be partially in the meat removing direction. This way, an even more effective severing of further meat may be achieved during said moving away from the bone during step d). Such a movement in the meat removing direction may effectively be provided for by a force, or, pressure control of the movement of the meat removing device in the meat removing direction, during the step c) and during step g). The movement partially in the meat removing directing during the step d) or at least during a part of step d) may be provided for in the same manner.

In an embodiment, meat which is in contact with the meat removing device at least during step d) is engaged by one or more engaging elements on the meat removing device, preferably wherein the one or more engaging elements comprise one or more of: an outer edge of the meat removing device which outer edge faces away from the bone; an inner edge of the meat removing device which inner edge faces the bone and protrudes from the meat removing device in the meat removing direction; one or more through holes; one or more protrusions; and a surface region having an increased roughness. The provision of such engaging elements, which may thus comprise an outer edge as mentioned, for example, which outer edge may have been designed such that meat may bulge about said edge at least during steps c) (and step g)) and step d), increases the effectiveness of the forcing away from the bone of meat during step d). In case of such engaging element, said provision of a force in the meat removing direction during step d) may still be of additional advantage.

In an embodiment wherein the one or more engaging elements comprise a surface region having an increased roughness, said region may be an outer region on the meat removing device, outside an inner region more close to the bone. By 'region having an increased roughness' is understood in this regard that said region, such as said outer region, has a higher roughness compared to another region on the meat removing device, such as said inner region. By such a specific surface finish a very effective removing of meat from the bone may be achieved wherein in such an inner region closer to the bone less resistance is exerted on the meat by the meat removing device compared to such an outer region further from the bone in use.

In an embodiment, the meat removing device comprises three, preferably four, meat removing plates, wherein each respective meat removing plate may have a curved meat removing section so as to follow at least a part of a cross-sectional contour of the bone in use, wherein each of the plates is movable, preferably pivotable about a pivot axis, between an inactive position and an active position, wherein during a meat removing movement at least three of the plates are put in the active position and wherein during a movement away from the bone those at least three plates are moved towards the inactive position. During a movement in the reposition direction the plates are preferably in the inactive position, or at least not in the active position. Preferably the pivot axes are parallel so that the movement of the at least three plates from the respective passive to the active positions is in parallel planes. So in that sense the at least three meat removing plates are mutually parallel.

In an embodiment, the meat removing device comprises two of such meat removing plates, which may be sufficient for the purpose of deboning of a spoon bone, for example.

An embodiment of the meat removing device having three such meat removing plates is very suitable for deboning a pork aitch bone or shank bone.

An embodiment of the meat removing device having four such meat removing plates is very suitable for deboning a femur or humerus bone. The effects of the present invention are most prominent in this latter embodiment, for deboning a femur or humerus bone. Carcass leg parts having said bones are processed in very high volumes and may be more complex to debone because of their irregular profile. Therefore, the deboning of such bones in accordance with the present invention leads to a relatively high increase in efficiency, wherein said provision of four of such meat removing plates increases the reliability and degree of severing of the meat from the bone.

In an embodiment, the support device comprises a supporting plate, wherein the method preferably comprises, for the purpose of step a), positioning the supporting plate in the pre-cut, for holding, preferably suspending, the leg by its lower end of the bone, the supporting plate preferably having a slot configured to hold therein the leg by the lower end of the bone. The slot is dimensioned such that a joint part of the bone at the lower end of the bone, such as a knee or elbow joint part, cannot pass through the slot.

In an embodiment of the method wherein the bone is a humerus bone, the method may comprise before step b), removing the shoulder blade (scapula) from the humerus bone.

In an embodiment, the second starting position is distanced further from the support device, that means in the meat removing direction, than the first starting position.

In an embodiment steps d), e), f), and g) execute at least one further cycle, preferably at least two further cycles, wherein for the purpose of the execution of step g) during a further cycle, the second end position is each time distanced further from the support device than the second end position of a preceding execution of step g). By doing so, the meat removing device thus gradually moves further in the meat removing direction, which is preferably downward, thereby removing meat from the bone in a highly controlled and robust manner.

In an embodiment, for the purpose of step c), the meat removing device is moved, by a drive unit such as a pneumatic cylinder, in the meat removing direction, by means of applying a predetermined force or force profile on the meat removing device.

In an embodiment, during a meat removing movement of the meat removing device in the meat removing direction, a force in the meat removing direction exerted by the meat removing device on the meat of the leg is reduced when the meat removing device reaches a neck of the bone. This is in particular of advantage with a humerus or femur bone. The meat removing device may be force controlled in a direction transverse to the meat removing direction. Thus, a force in the direction of the bone caused by the meat removing plates of the meat removing device may temporarily be reduced, which further assists in passing the neck of the bone. In an embodiment of the meat removing device having four meat removing plates, a fourth meat removing plate may at least be put in the active position thereof while the meat removing device passes the neck of the bone, so that this fourth scraper at least during the passing of the neck, assists in effectively removing meat from the bone.

In an embodiment, for the purpose of step c) and/or step g), the respective first and/or second meat removing movements are executed for a respective predetermined time, meaning that the duration of an individual meat removing movement is set at a predetermined value.

Corresponding embodiments are also applicable for the below described system according to a second aspect of the present invention. The system is in particular arranged for carrying out the above-described method and embodiments thereof according to the first aspect of the invention.

In a second aspect, the invention provides a system, for deboning a carcass leg part of a four-legged slaughter animal, for removing meat from a bone of the carcass leg part, preferably in accordance with a method according to the first aspect of the present invention.

The system comprises:

a support device, configured for holding the leg part by the lower end of the bone, or by a still lower part of the leg such as a foot, a meat removing device for removing meat from the bone, and a control unit configured for in use of the system, successively:

causing the meat removing device to be moved into a pre-cut, towards the bone, to a first starting position, which pre-cut is a cut made along the circumference of the bone at, or at least near, a lower end of the bone so as to sever muscle fibers, causing the execution by means of the meat removing device of a first meat removing movement from the first starting position in a meat removing direction away from the support device along the bone to a first end position so that meat is removed from the bone, causing the meat removing device to be moved away from the bone, wherein meat which is in contact with the meat removing device is forced away from the bone and, thereby, severs further meat from the bone, causing the meat removing device to be moved in a reposition direction towards the support device, causing the meat removing device to be moved towards the bone to a second starting position, and causing the execution by means of the meat removing device of a second meat removing movement from the second starting position in the meat removing direction away from the support device along the bone to a second end position distanced further from the support device than the first end position so that further meat is removed from the bone.

In an embodiment, the meat removing device comprises at least three, preferably three up to and including eight, further preferably four, five or six, still further preferably four, meat removing plates, each movable, preferably pivotable about a pivot axis, between an inactive position and an active position, the plates in the active position being closer to the bone in use, the plates being positioned such that in use the bone is in between the plates at least in the active position, extending at least substantially perpendicular to a plane of the plates. During a movement of the meat removing device towards the bone, at least three of the meat removing plates are brought in the active position so as to capture the bone in between respective meat removing sections of those at least three meat removing plates, wherein each respective meat removing plate preferably has a curved meat removing section so as to follow at least a part of a cross-sectional contour of the bone in use. As already mentioned above, preferably the pivot axes are parallel so that the movement of the at least three plates from the respective passive to the active positions is in parallel planes. So in that sense the at least three meat removing plates are mutually parallel.

In an embodiment, the meat removing device comprises four meat removing plates in the form of two pairs of meat removing plates, preferably wherein the meat removing plates of at least one pair are operated jointly.

In another embodiment, the meat removing device comprises four meat removing plates in the form of one pair of meat removing plates being operated jointly, and two individually operable further meat removing plates, wherein operable means movable between the active and passive position thereof.

In an embodiment, at least two of the at least three meat removing plates comprises one or more engaging elements, preferably wherein the one or more engaging elements comprise one or more of: an outer edge of the meat removing device which outer edge faces away from the bone; an inner edge of the meat removing device which inner edge faces the bone and protrudes from the meat removing device in the meat removing direction; one or more through holes; one or more protrusions; and a surface region of increased roughness, which engaging elements in use are in contact with the meat during a meat removing movement, so that as a result meat is forced away from the bone and severs further meat from the bone as a result of the moving away from the bone of the meat removing device during the subsequent movement of the meat removing device away from the bone.

In an embodiment the control system is configured, for the purpose of the execution of a meat removing movement, to cause a reduction of a force in the meat removing direction exerted by the meat removing device on the meat of the leg when the meat removing device reaches a neck of the bone.

Corresponding embodiments are also applicable for the above described method according to the first aspect of the present invention. Effects of the system according to the present invention are analogue to the effects of the method according to the invention as described above.

In general terms the present invention relates to a system configured for, and method of, removing meat from a bone of a carcass leg part, comprising the subsequent steps of:

a) holding, by a support device, of the leg part,
b) moving a meat removing device: into a pre-cut,
c) then away from the support device along the bone to a first end position so that meat is removed from the bone,
d) then away from the bone, forcing meat away from the bone and severing further meat from the bone,
e) then towards the support device,
f) and then towards the bone,
g) and then again away from the support device along the bone to a second end position distanced further from the support device than the first end position so that further meat is removed from the bone.

BRIEF DESCRIPTION OF DRAWINGS

The present invention is described hereinafter with reference to the accompanying schematic drawings in which embodiments of the present invention are shown and in which like reference numbers indicate the same or similar elements.

DESCRIPTION OF EMBODIMENTS

Figure 1:
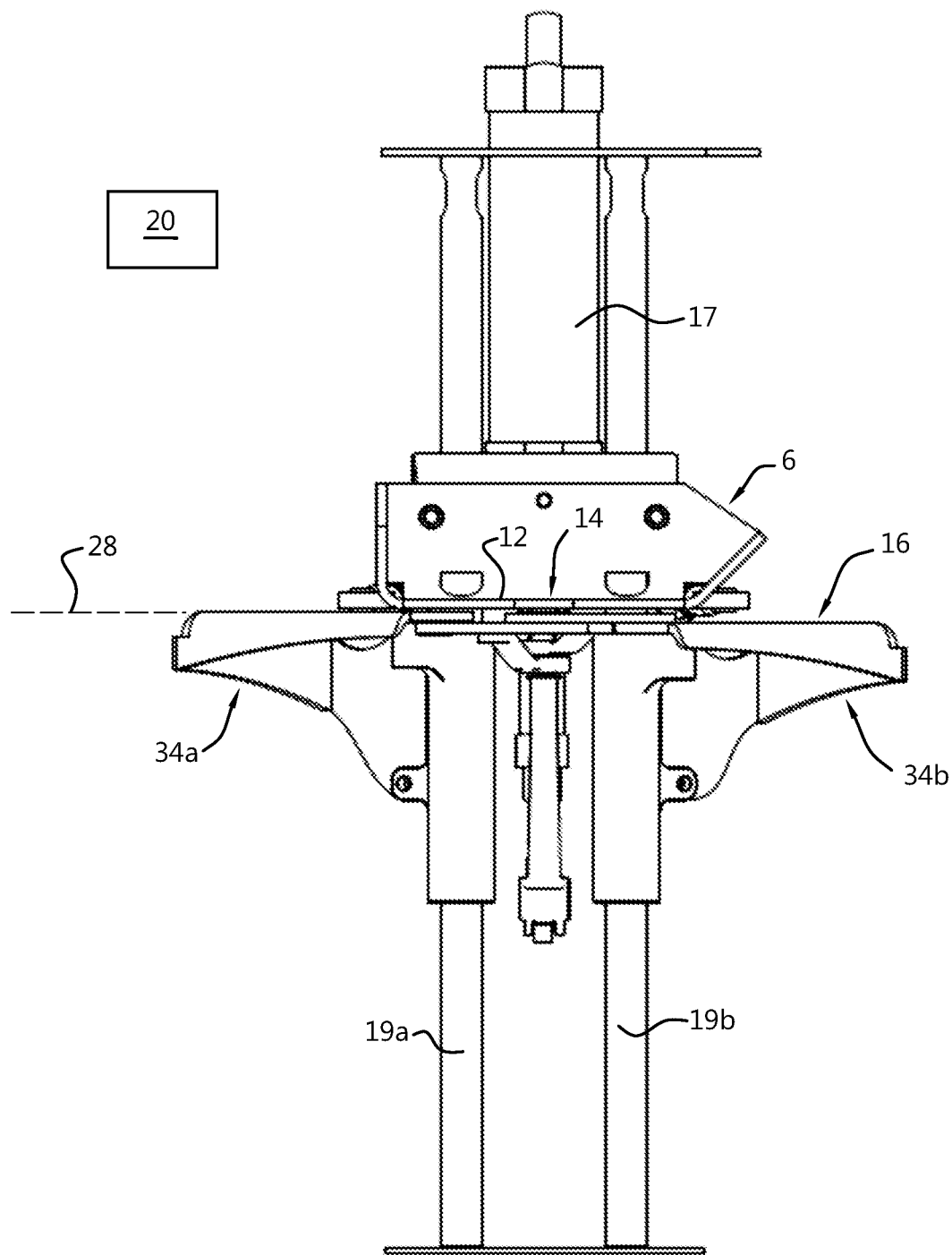
FIG. 1 shows, in front view, an embodiment of a device according to the invention.
Figure 2:
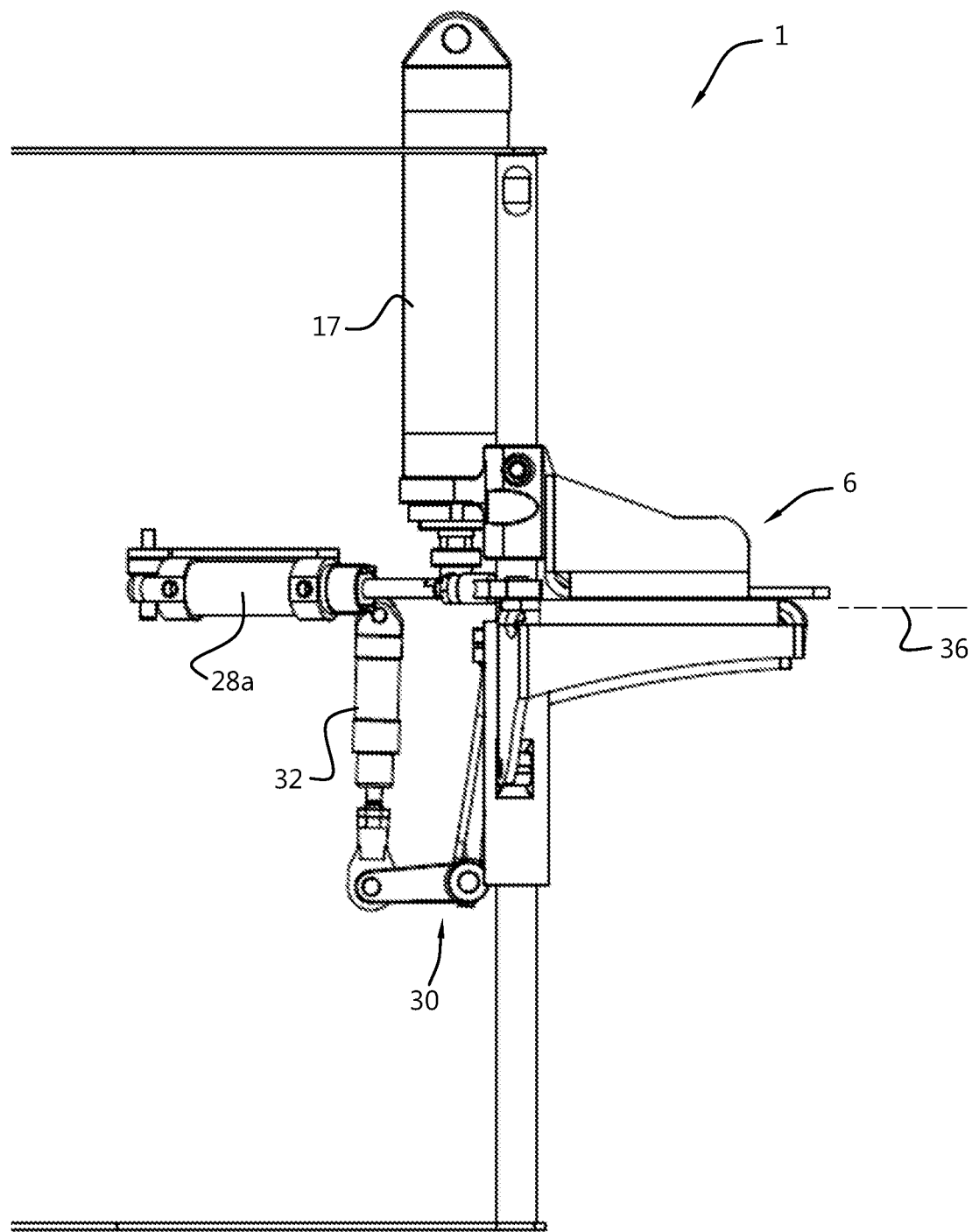
FIG. 2 shows the device of FIG. 1 in side view in another operating state.
Figure 3:
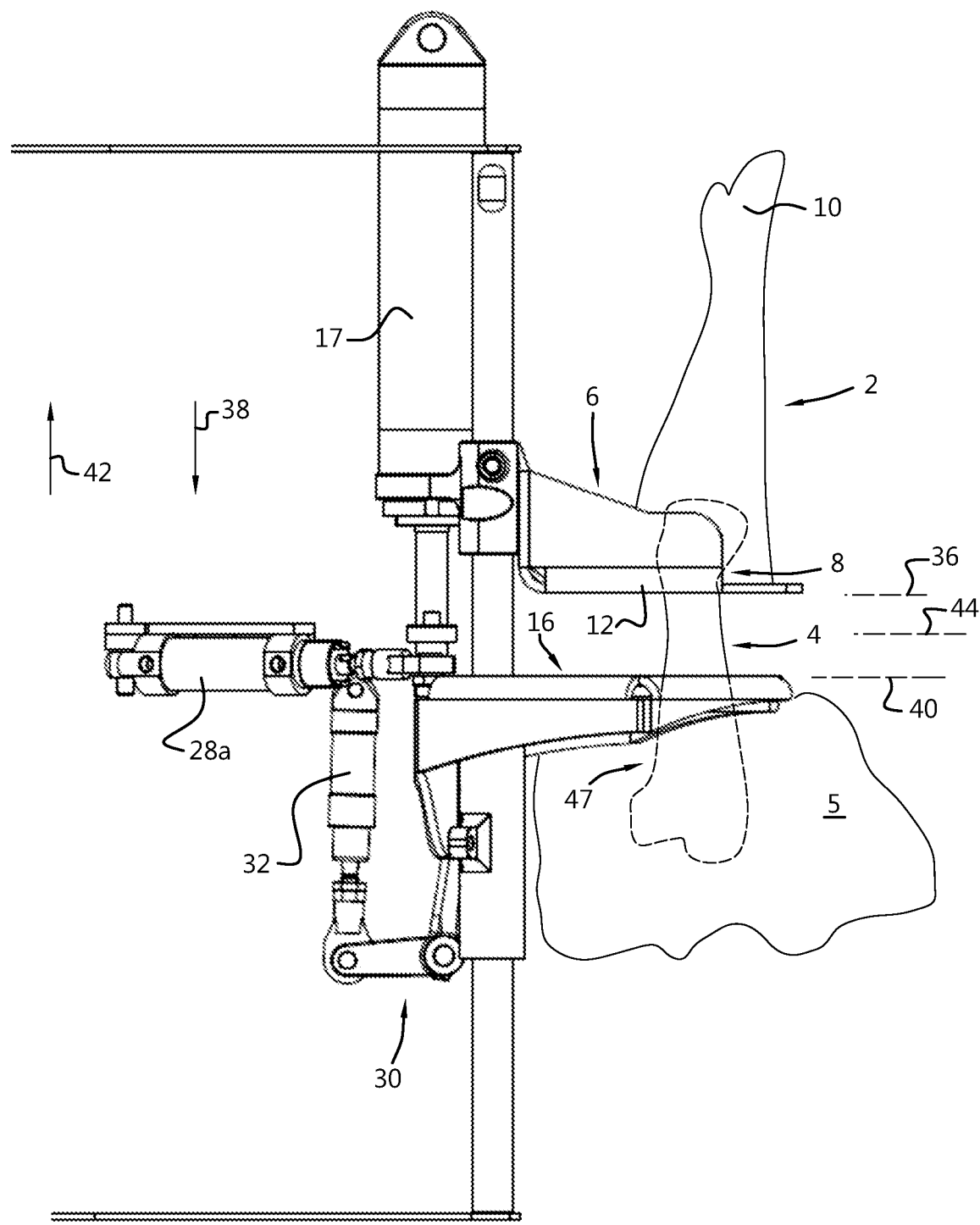
FIG. 3 shows the device of FIG. 1 in side view, in still another operating state.

FIGS. 1 to 6 show a system 1 for deboning a carcass leg part 2 of a four-legged slaughter animal. The system is arranged for removing meat from a humerus bone 4 of the carcass leg part 2. The leg part 2 is only shown in FIG. 3. The system has a support device 6 configured for holding the leg part 2 by the lower end 8 of the bone, or by a still lower part of the leg such as a foot 10. The support device 6 has a supporting plate 12 for suspending the leg part 2 by the lower end 8 of the bone. For that purpose, the supporting plate 12 has a slot 14, which supporting plate is positioned in a pre-cut in the leg part 2. The pre-cut is a cut made along the circumference of the bone 4 at, or at least near, a lower end 8 of the bone so as to sever muscle fibers. In the view of FIG. 3 the pre-cut thus has been made at the vertical position along the bone of the supporting plate 12. The system 1 may be provided on a transport device such as a carrousel, as part of or at least along a processing line for processing such carcass leg parts. The leg part 2 may have been transferred from a shackle of an overhead conveyor to the support device 6. A cutting station may have been provided upstream of the system 1 for the purpose of making the pre-cut in an automated manner.

The system 1 further has a meat removing device 16 for removing meat from the bone 4. The meat removing device 16 is movable in a vertical direction in the view of the figures from and to the support device, and is to that end connected to a drive unit in the form of a pneumatic cylinder 17 and guided by vertical guide bars 19a and 19b. Instead of the use of pneumatic cylinder 17, a spindle may be used, for example.

Figure 4:
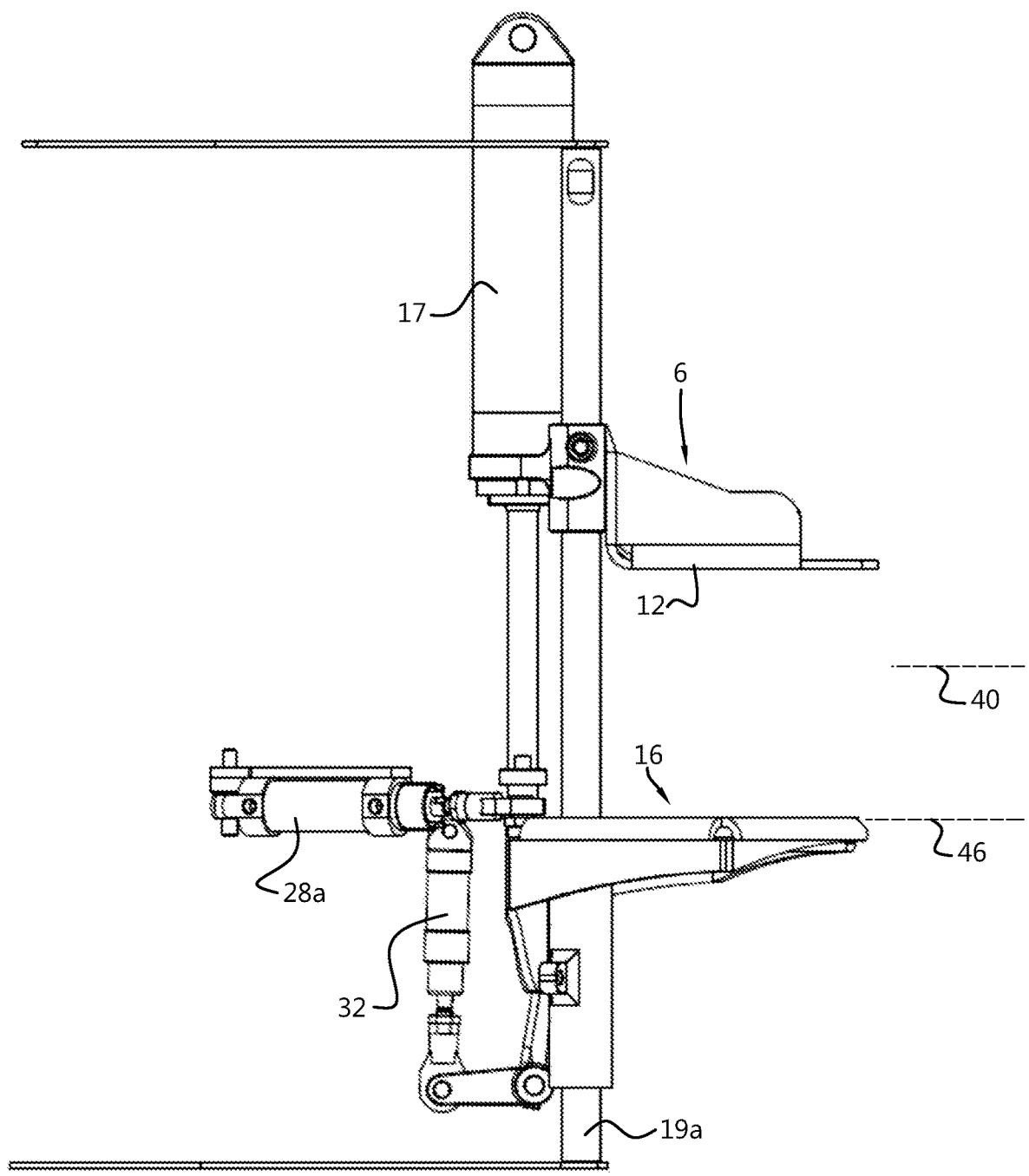
FIG. 4 shows the device of FIG. 1 in side view, in yet another operating state.
Figure 5:
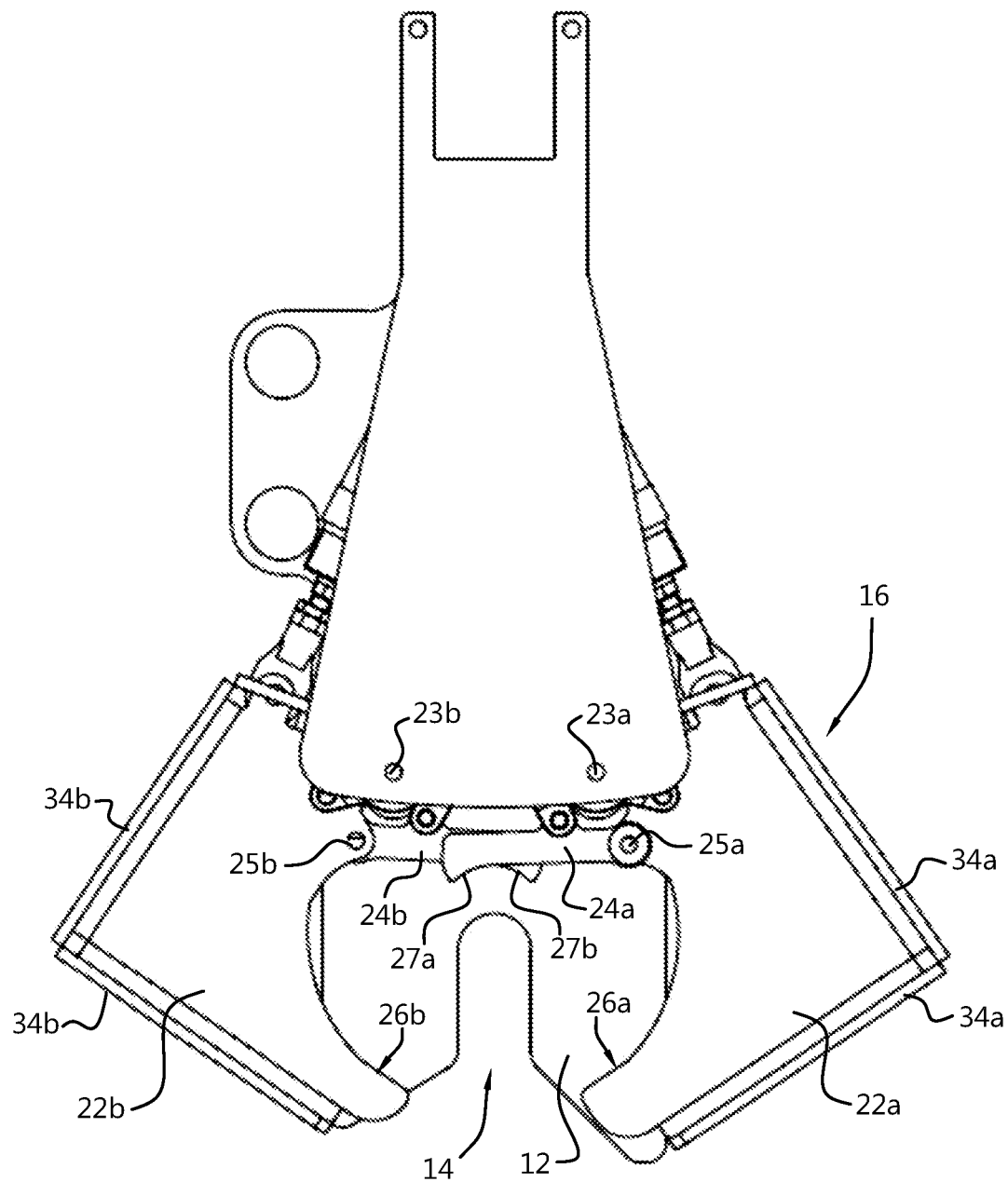
FIG. 5 shows the device of FIG. 1 in bottom view.
Figure 6:
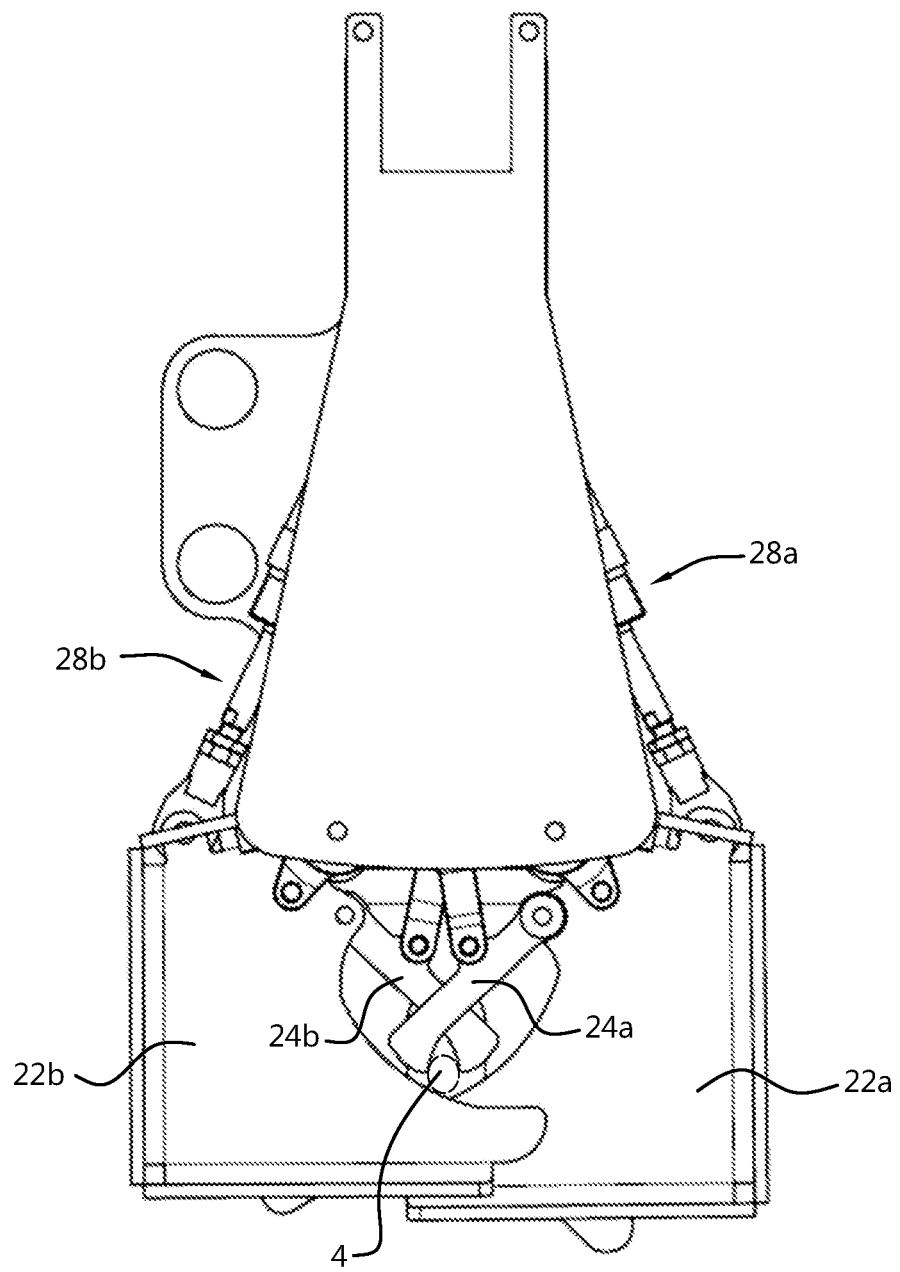
FIG. 6 shows the device of FIG. 2 in bottom view.

For the purpose of removing meat from the bone 4, the meat removing device 16 comprises four mutually parallel, that is, the planes of the plates are mutually parallel, meat removing plates in the form of a first pair of meat removing plates 22a, 22b and a second pair of meat removing plates 24a, 24b, which are in particular clearly shown in FIGS. 5 and 6. The plates 22a and 22b are pivotable about a respective pivot axis 23a and 23b, while the plates 24a and 24b are pivotable about a respective pivot axis 25a and 25b. The pivot axes 23a,b and 25a,b extend mutually parallel. Each of the plates 22a,b and 24a,b is pivotable between an inactive position and an active position thereof. In the active position, shown in FIGS. 6 and 2, the plates are closer to the bone 4 in use than in the inactive position thereof, shown in FIGS. 5 and 1, 3 and 4. As FIG. 6 shows, in the active position the four plates are positioned such that the bone 4 is in between the plates and extends at least substantially perpendicular to a plane 28 of the plates. During a movement of the meat removing device 6 towards the bone 4, the meat removing plates are brought in the active position so as to capture the bone 4 in between respective meat removing sections 26a,b and 27a,b, respectively, of the meat removing plates 22a,b and 24a,b. As FIGS. 5 and 6 show, the meat removing section of each of the meat removing plates is curved so as to follow at least a part of a cross-sectional contour of the bone 4 in use.

The pair of plates 22a, 22b are operated by means of respective pneumatic cylinders 28a and 28b which are independently controlled so that they can independently extend and retract under the influence of a varied pneumatic pressure so as to pivot the respective plates 22a and 22b between the inactive and the active positions thereof. In another embodiment, the plates 22a and 22b may be operated jointly. Instead of the use of pneumatic cylinders, solenoids, electromagnetic actuators, spindles, cam/followers, lever mechanisms may be used. The smaller plates 24a, 24b are operated jointly to move between the passive and active position thereof by a shared lever mechanism actuated by a single pneumatic cylinder. Instead of the use of pneumatic cylinders and/or lever mechanisms, solenoids, electromagnetic actuators, spindles, cam/followers, may be used, for example. Operating the plates by means of pneumatic cylinders also provides for a spring load on the plates at least in the active position so that the plates may more easily follow the irregular contour of the bone in use as will be explained below. The provision of one or more pressure sensors (not shown) in the pneumatic circuit may further assist in reliably letting the meat removing device follow the contour of the bone, for which purpose a pressure exerted on the meat or bone in the active position of the meat removing plates may be reduced if a sudden pressure rise is detected by the one or more pressure sensors. Further, the control system may be configured to be self-learning for the purpose of deboning the same bone of multiple carcass parts which are successively processed. A force profile on the meat removing plates, such as for the purpose of a movement in the meat removing direction 38 as will be discussed below, may be adapted based on information obtained, by suitable sensors such as pressure sensors, during a similar movement during the deboning of one or more preceding bones.

The meat removing plates 22a, 22b each comprise engaging elements formed by respective outer edges 34a, 34b of the meat removing device facing away from the bone. As in particular FIG. 1 shows, the outer edges are bent downwards. During use, the engaging elements in the form of the edges 34a, 34b are in contact with the meat during a meat removing movement as will be further explained below. Instead of said outer edges 34a, 34b, the engaging elements may comprise an inner edge of the meat removing device which inner edge faces the bone and protrudes from the meat removing device in the meat removing direction; one or more through holes; one or more protrusions; and/or a surface region having an increased roughness. Such a surface region having an increased roughness may be a region with an increased roughness located on an outer, bottom side of the meat removing plates 22a, 22b, compared to a more inward located region having a relatively lower roughness on an inner bottom side. This way, meat may slide outwards along the bottom side of the meat removing plates relatively close to the bone and may be engaged further outwards by the surface region having the increased roughness.

Figure 7:
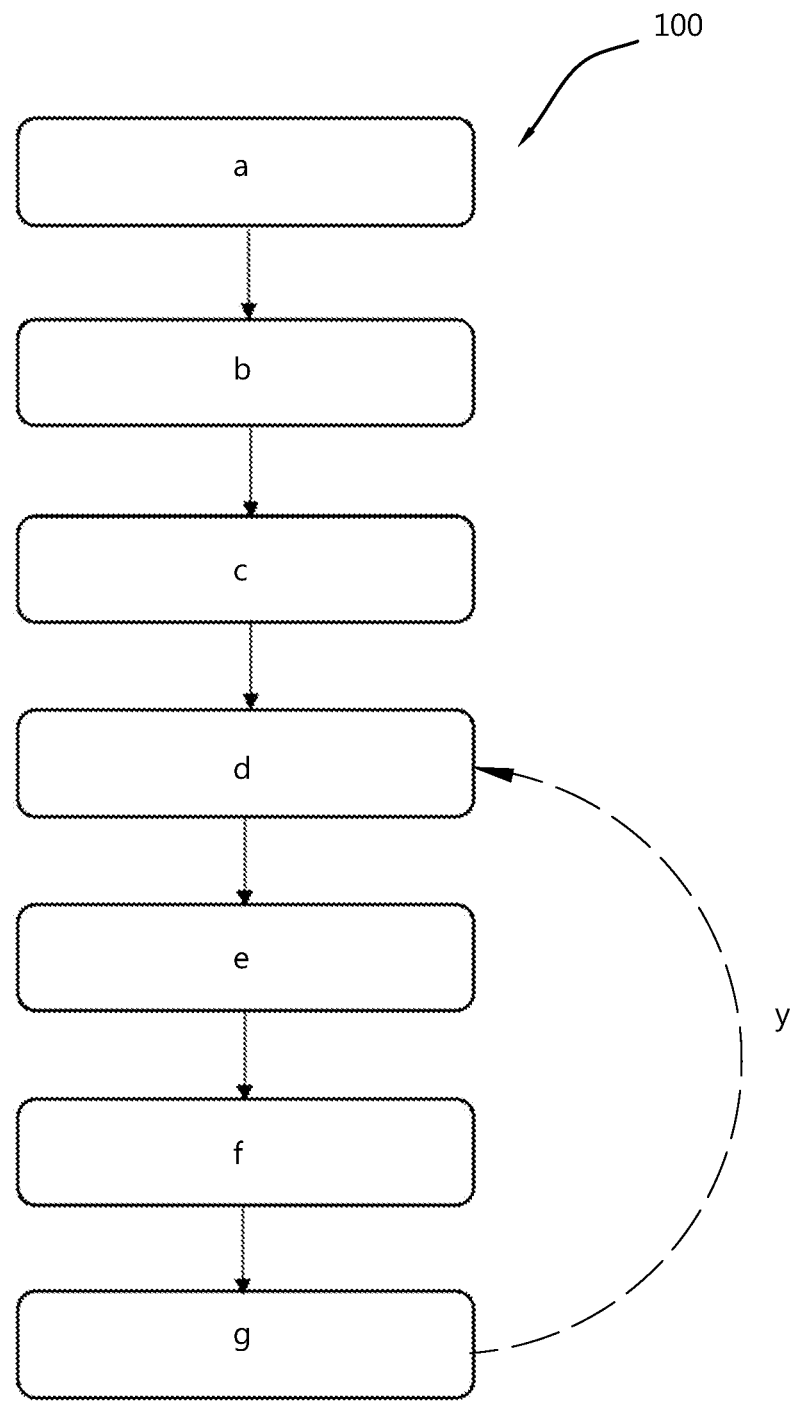
FIG. 7 shows embodiments of a method according to the invention.
Figure 8:
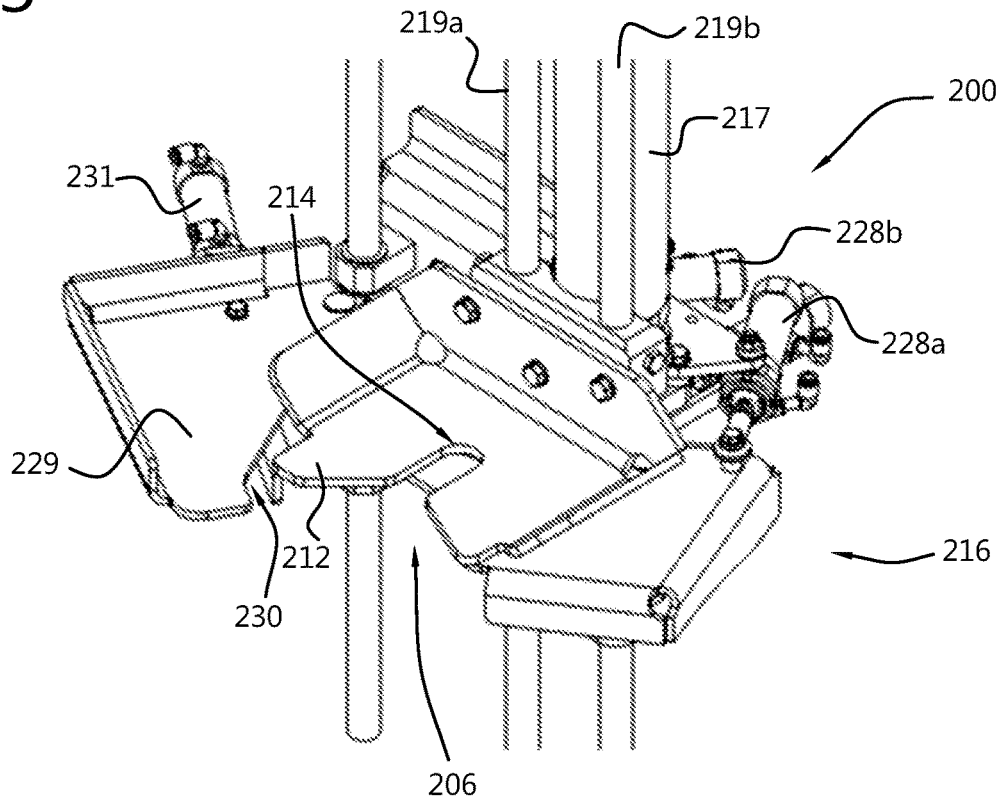
FIG. 8 shows, in 3D (elevated perspective) view, a further embodiment of a device according to the invention.

In use, for the purpose of removing meat from the bone 4 of the carcass leg part 2, the system 1 is operated in accordance with the following method 100 (FIG. 7). For the purpose of executing said method, the system has a control unit 20. The control unit is operatively connected to the meat removing device 16, and in particular, to the pneumatic cylinders 17, 28a, 28b, 32. The control unit 20 is configured for in use of the system executing the following method steps:

a) holding, by the support device 6, of the leg part 2 by the lower end 8 of the bone 4. A cutting station may have been provided upstream of the system 1 for the purpose of making a pre-cut in an automated manner.

b) then the meat removing device 16 is moved into the pre-cut, towards the bone 4, to a first starting position 36. For this purpose the meat removing plates 22a,b and 24a,b are moved from their inactive position (FIG. 5) into the active position (FIGS. 6 and 1 and 2). In this regard it is noted that a height position of the meat removing device with respect to the support device 6 is indicated in the figures as being a certain starting or end position.

c) then, the meat removing device 16 performs a first meat removing movement from the first starting position 36 (FIG. 2) in a meat removing direction 38 away from the support device 6 (so it is moved downwards in the view of the figures) along the bone 4 to a first end position 40 (FIG. 3) so that meat 5 is removed from the bone 4 as also shown in FIG. 3.

The meat removing device is moved in the meat removing direction by means of applying a predetermined force or force profile on the meat removing device 16. The force or force profile may be dependent on the particular carcass leg part to be deboned.

d) Then, the meat removing device 16 is moved away from the bone, for which purpose the meat removing plates are moved from the active position to the passive position by means of applying a force on the meat removing plates by the (double-acting) cylinders 28a,b and 32. This outward movement, transverse to the meat removing direction 38 and thus in essence transverse to a direction of extension of the bone 4, results in meat 5 which is in contact with the meat removing device 16 being forced away from the bone 4 and severs further meat from the bone 4. The downward extending outer edges 34a, 34b engaging the meat 5 during this method step significantly contribute to said forcing away of meat from the bone thereby severing further meat from the bone.

During this step of moving away from the bone, a force in the meat removing direction 38 is, i.e. remains to be, exerted on the meat 5 by the meat removing device 16. This may be achieved by maintaining a downward force, by the cylinder 17, on the meat removing device 16 during this step. The movement of the meat removing device 16 away from the bone is thus partially in the meat removing direction 38, so partially downwards in the view of the figures. This further contributes to the effective forcing away of meat from the bone.

e) Then, the meat removing device 16 is moved in a reposition direction 42, upwards in the view of the figures, towards the support device 6.

f) Then, the meat removing device 16 is moved towards the bone 4 to a second starting position 44, i.e. the second starting position 44 is at the height indicated in FIG. 3. The second starting position 44 may be at the same, uppermost, level of the first starting position 36, or may be in between the first starting position 36 and the first end position 40 as FIG. 3 shows. It is noted that FIG. 3 only shows the height of the second starting position and not the meat removing device in that position.

g) Then, by means of the meat removing device 16, a second meat removing movement is made from the second starting position 44 in the meat removing direction 38 away from the support device 6 along the bone 4 to a second end position 46 distanced further from the support device 6 than the first end position 44 as FIG. 4 shows, so that further meat is removed from the bone 4.

In an embodiment of the method, which may be dependent on the specific carcass leg part to be deboned, steps d), e), f), and g) are executed at least one further cycle (indicated by 'y' in FIG. 7), wherein for the purpose of the execution of step g) during a further cycle, the second end position is each time distanced further from the support device than the second end position of a preceding execution of step g). By doing so, the meat removing device thus gradually moves further downward during successive iterations, or, cycles, thereby removing meat from the bone in a highly controlled and robust manner.

The control system 20 is configured, for the purpose of the execution of a meat removing movement of a step c) or g), to cause a reduction of a force in the meat removing direction 38 exerted by the meat removing device 16 on the meat of the leg when the meat removing device reaches a neck 47 of the bone 4.

Also, for the purpose of step c) and/or step g), the respective first and/or second meat removing movements are executed for a respective predetermined time.

FIGS. 8 to 14 show a system 200, being another embodiment of a system according to the invention, for deboning a carcass leg part 2 of a four-legged slaughter animal. The system 200 is similar to the system 1 described above. Components of system 200 with the same or at least a similar function as components of system 1 are identified by a reference sign corresponding to that of FIGS. 1-7, to which 200 has been added. For the purpose of describing the function of the system 200, the above description of system 1 applies in an analogue manner.

The system has a support device 206 configured for holding the leg part 2 by the lower end 8 of the bone, or by a still lower part of the leg such as a foot 10. The support device 206 is very similar to the support device 6, see FIG. 5. It also has a supporting plate 212 having a slot 214 for suspending the leg part 2 by the lower end 8 of the bone, the supporting plate 212 in use being positioned in a pre-cut in the leg part 2 in the same manner as shown in FIG. 3.

The system 200 further has a meat removing device 216 for removing meat from the bone 4. The meat removing device 216 is designed slightly different from meat removing device 16, but it is, like device 16, movable in a vertical direction in the view of the figures from and to the support device 206, and is to that end connected to a drive unit in the form of a pneumatic cylinder 217 and guided by vertical guide bars 219a and 219b.

Figure 12:
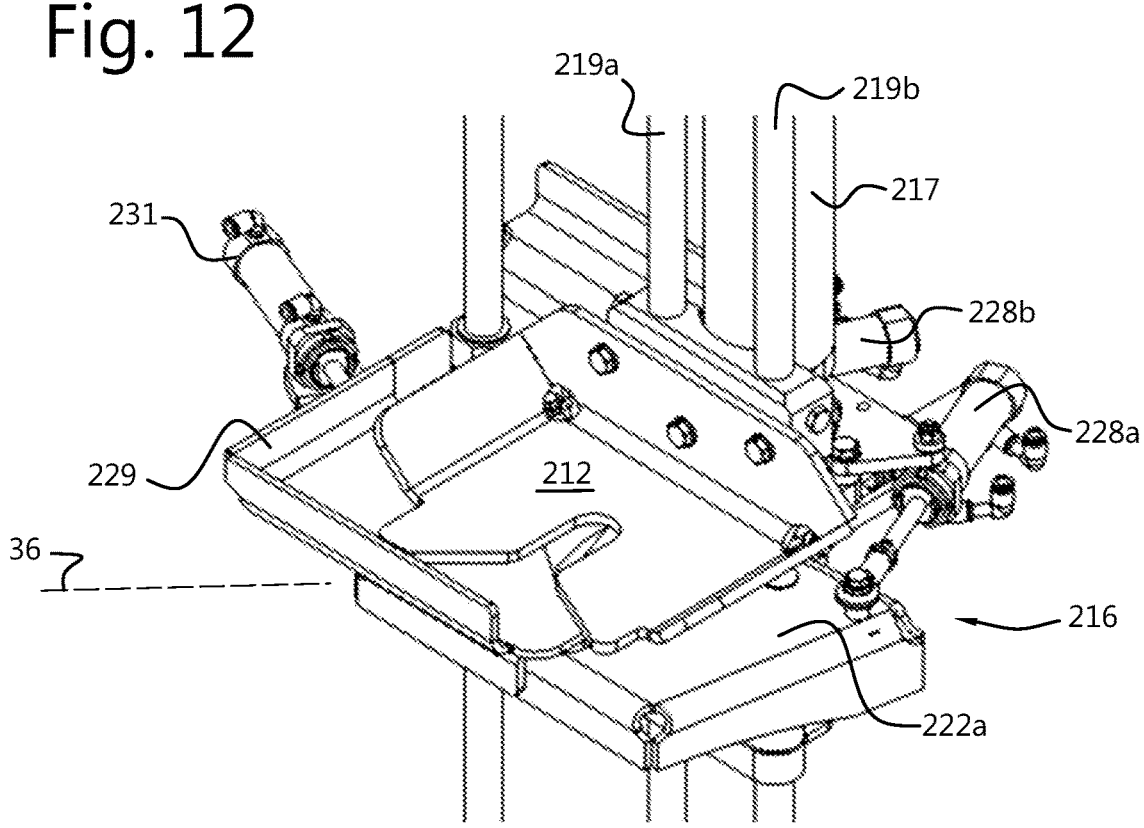
Figure 13:
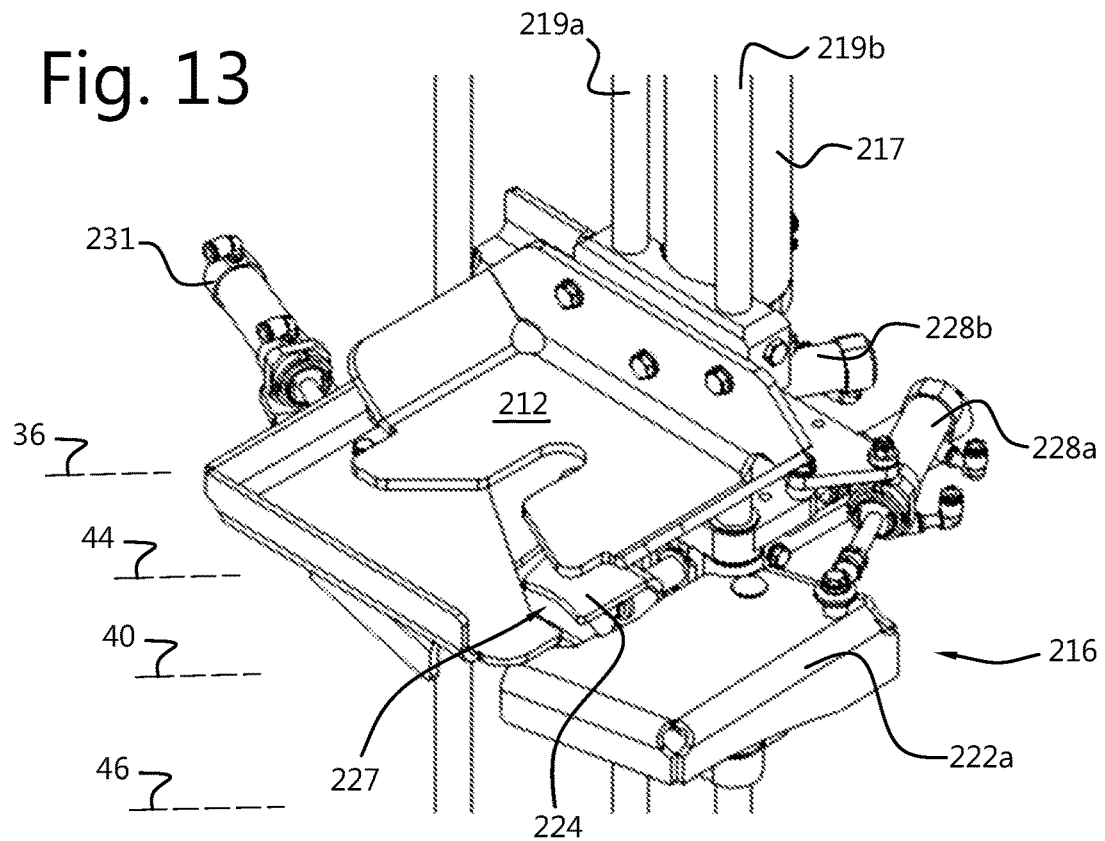
Figure 14:
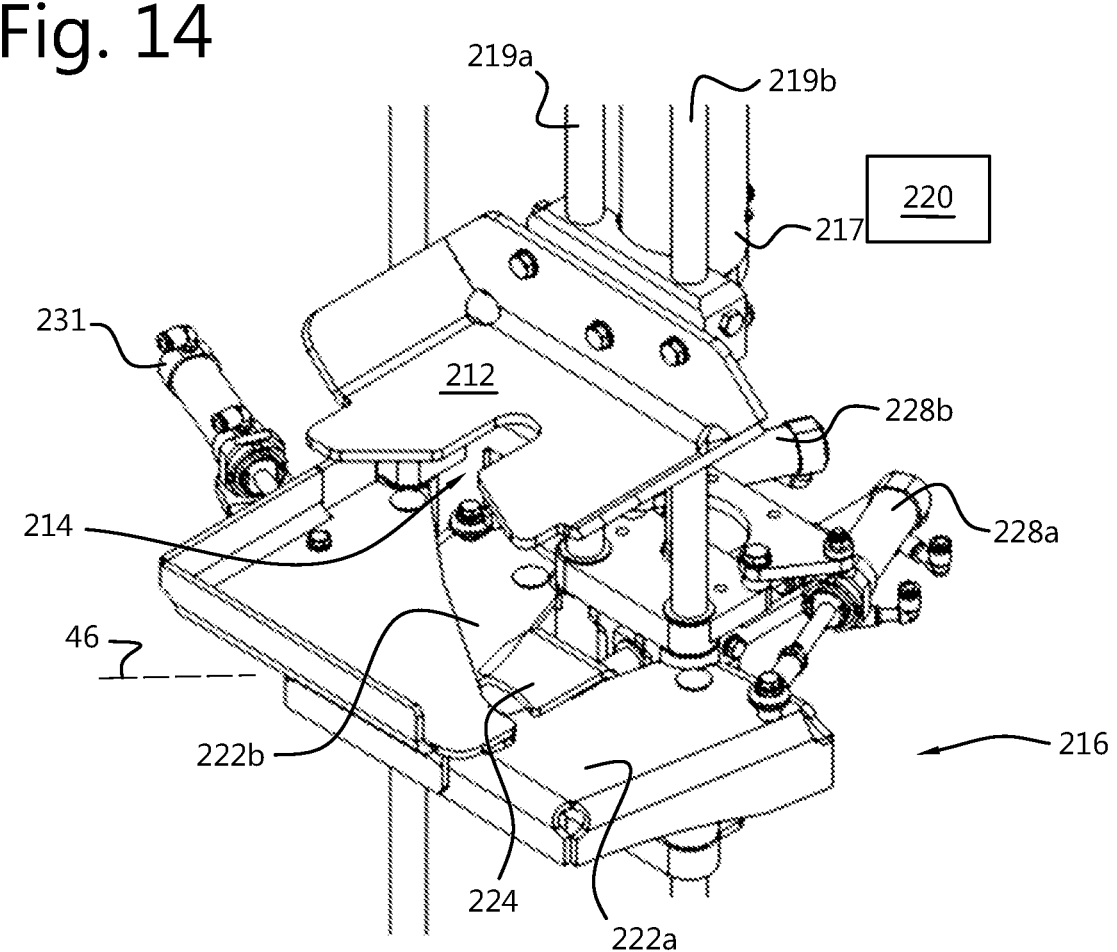

For the purpose of removing meat from the bone 4, the meat removing device 216 comprises four mutually parallel, that is, the planes of the plates are mutually parallel, meat removing plates in the form of a first pair of meat removing plates 222a, 222b which are highly similar to meat removing plates 22a and 22b. The plates 222a and 222b are pivotable about a respective pivot axis 223a and 223b. Other than device 16, the meat removing device 216 does not have a second pair of meat removing plates. Instead, it has one single back meat removing plate 224 which is translatable, by means of a pneumatic cylinder 232 in a plane parallel to the plates 222a and 222b as can be derived from FIG. 10. The device 216 also has an extra front meat removing plate 229, pivotable about a pivot axis 233 by means of a pneumatic cylinder 231. Each of the plates 222a, 222b and 229 are pivotable between an inactive position and an active position thereof, while plate 224 is translatable between an inactive position and an active position thereof. FIGS. 9-12 and 14 show the plates 222a and 222b in the active position while in FIG. 8 they are in their passive position. Back meat removing plate 224 is shown in the active position thereof in any of the FIGS. 8-14. FIGS. 12-14 show the extra front plate 229 in the active position while in FIGS. 8-11 it is in the passive position thereof. In the active position, the plates are closer to the bone 4 in use than in the inactive position thereof. During a movement of the meat removing device 216 towards the bone 4, meat removing plates 222a and 222b are brought in the active position so as to capture the bone 4 in between respective meat removing sections 226a and 226b respectively, of the meat removing plates 222a and 222b. Said meat removing sections are curved, in a similar manner as plates 22a and 22b, so as to follow at least a part of a cross-sectional contour of the bone 4 in use. During a movement of the meat removing device 216 towards the bone 4, also the back meat removing plate 224 and/or the extra front meat removing plate 229 may be brought in the active position to assist in a meat removing step.

The pair of plates 222a, 222b are operated by means of respective pneumatic cylinders 228a and 228b which are independently controlled so that they can independently extend and retract under the influence of a varied pneumatic pressure so as to pivot the respective plates 222a and 222b between the inactive and the active positions thereof. In another embodiment, the plates 222a and 222b may be operated jointly. Instead of the use of pneumatic cylinders, solenoids, electromagnetic actuators, spindles, cam/followers, lever mechanisms may be used. Operating the plates by means of pneumatic cylinders also provides for a spring load on the plates at least in the active position so that the plates may more easily follow the irregular contour of the bone in use as will be explained below. The provision of one or more pressure sensors (not shown) in the pneumatic circuit may further assist in reliably letting the meat removing device follow the contour of the bone, for which purpose a pressure exerted on the meat or bone in the active position of the meat removing plates may be reduced if a sudden pressure rise is detected by the one or more pressure sensors. Further, the control system may be configured to be self-learning for the purpose of deboning the same bone of multiple carcass parts which are successively processed. A force profile on the meat removing plates, such as for the purpose of a movement in the meat removing direction 38 as will be discussed below, may be adapted based on information obtained, by suitable sensors such as pressure sensors, during a similar movement during the deboning of one or more preceding bones.

The meat removing plates 222a, 222b each comprise engaging elements formed by respective outer edges 234a, 234b of the meat removing device facing away from the bone, similar to plates 22a and 22b. Instead of said outer edges the engaging elements may comprise an inner edge of the meat removing device which inner edge faces the bone and protrudes from the meat removing device in the meat removing direction; one or more through holes; one or more protrusions; and/or a surface region having an increased roughness. Such a surface region having an increased roughness may be a region with an increased roughness located on an outer, bottom side of the meat removing plates 222a, 222b, compared to a more inward located region having a relatively lower roughness on an inner bottom side. This way, meat may slide outwards along the bottom side of the meat removing plates relatively close to the bone and may be engaged further outwards by the surface region having the increased roughness.

Figure 9:
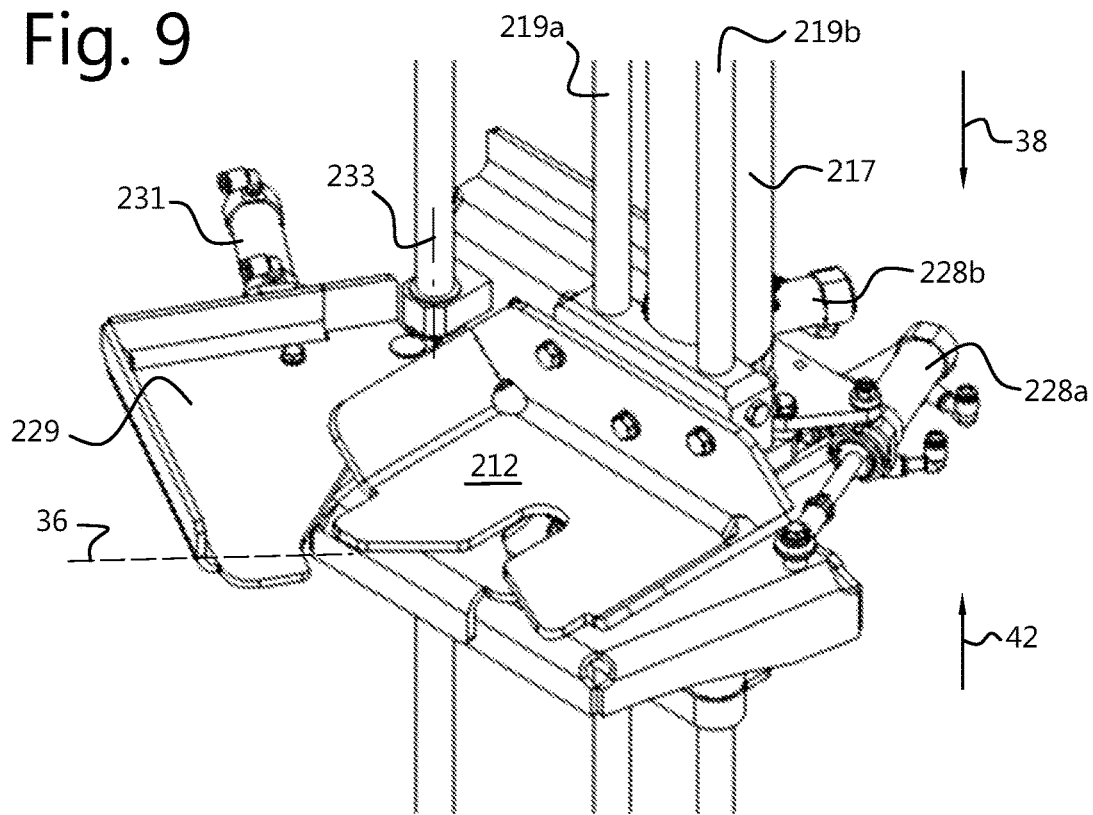
FIGS. 9-14 show the device of FIG. 8 in different operating conditions and views.
Figure 10:
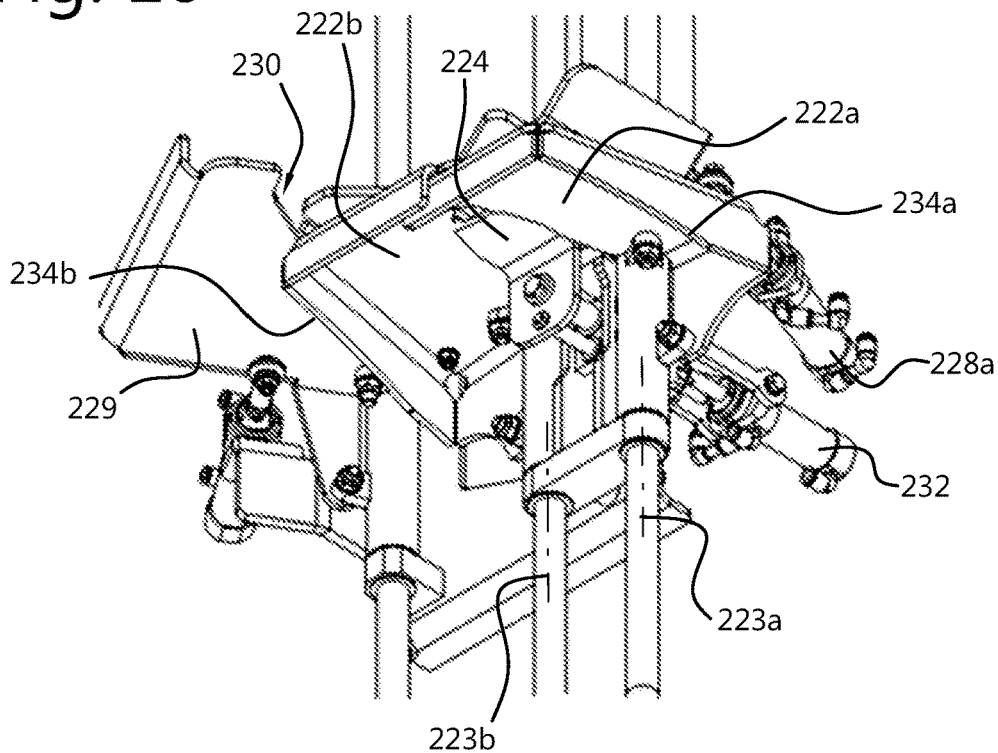
Figure 11:
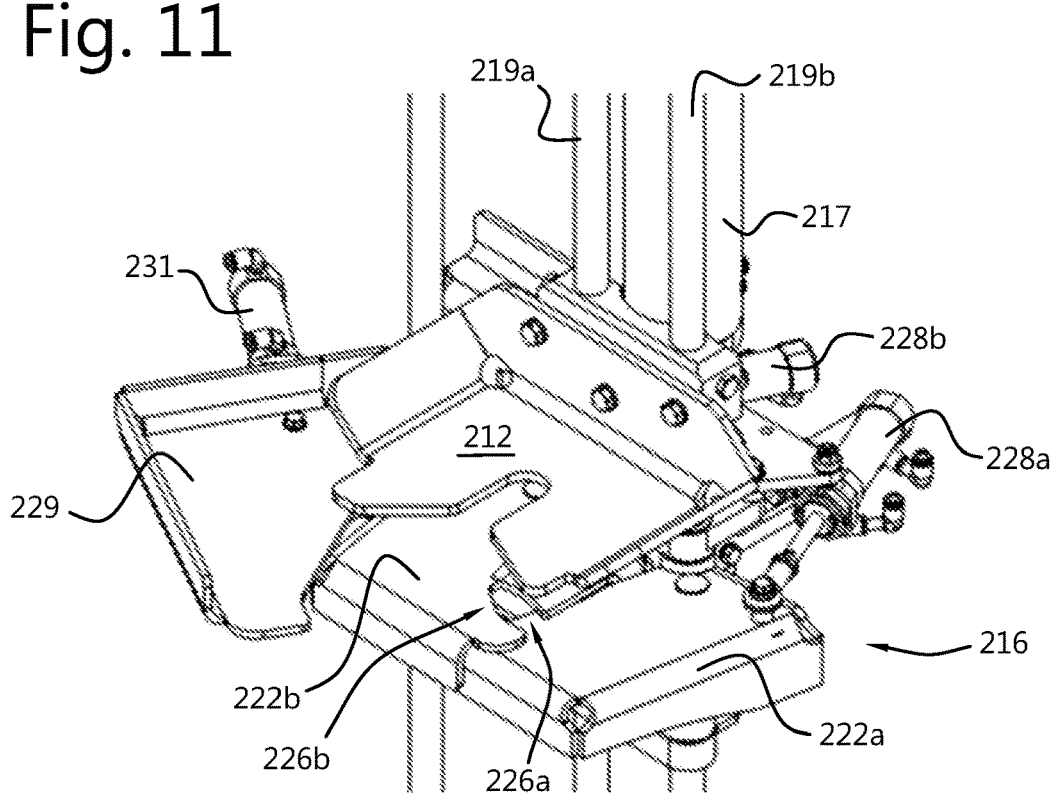

In use, for the purpose of removing meat from the bone 4 of the carcass leg part 2, the system 200 is operated in accordance with a method similar to method 100 as represented in FIG. 7. That is, the method of system 200 also follows successive method steps which may be referred to as method steps a to g. For the purpose of executing said method, the system has a control unit 220, only very schematically shown in FIG. 14. The control unit is operatively connected to the meat removing device 216, and in particular to the pneumatic cylinders 217, 228a, 228b, 231 and 232. The control unit 220 is configured for in use of the system executing the following method steps:

a) holding, by a support device 206, of the leg part 2 by the lower end 8 of the bone 4, in the same manner as shown in FIG. 5. A cutting station may have been provided upstream of the system 200 for the purpose of making a pre-cut in an automated manner.

b) then the meat removing device 216 is moved into the pre-cut, towards the bone 4, to a first starting position 36. For this purpose, the meat removing plates 222a, 222b are moved from their inactive position (FIG. 8) into the active position (FIG. 9). Also, and preferably only after that the plates 222a and 222b are moved into their active positions, the back plate 224 is moved from the inactive position into the active position.

c) then, the meat removing device 216 performs a first meat removing movement from the first starting position 36 in a meat removing direction 38 away from the support device 206 (so it is moved downwards in the view of the figures) along the bone 4 to a first end position in the same manner as device 16 moves to a first end position 40, so that meat 5 is removed from the bone 4.

The meat removing device is moved in the meat removing direction by means of applying a predetermined force or force profile on the meat removing device 216. The force or force profile may be dependent on the particular carcass leg part to be deboned.

d) Then, the meat removing device 216 is moved away from the bone, for which purpose the meat removing plates 222a, 222b and 224 are moved from the active position to the passive position by means of applying a force on the meat removing plates by the (double-acting) cylinders 228a, 228b and 232. This outward movement, transverse to the meat removing direction 38 and thus in essence transverse to a direction of extension of the bone 4, results in meat 5 which is in contact with the meat removing device 216 being forced away from the bone 4 and severs further meat from the bone 4. The downward extending outer edges 234a, 234b engaging the meat 5 during this method step significantly contribute to said forcing away of meat from the bone thereby severing further meat from the bone.

During this step of moving away from the bone, a force in the meat removing direction 38 is, i.e. remains to be, exerted on the meat 5 by the meat removing device 216. This may be achieved by maintaining a downward force, by the cylinder 217, on the meat removing device 216 during this step. The movement of the meat removing device 216 away from the bone is thus partially in the meat removing direction 38, so partially downwards in the view of the figures. This further contributes to the effective forcing away of meat from the bone.

e) Then, the meat removing device 216 is moved in a reposition direction 42, upwards in the view of the figures, towards the support device 206.

f) Then, the meat removing device 216 is moved towards the bone 4 to a second starting position 44 which may be at the height indicated in FIG. 13. The second starting position 44 may be at the same, uppermost, level of the first starting position 36, or may be in between the first starting position 36 and the first end position 40 as FIG. 13 shows. The different heights shown in FIG. 13 do not per se relate to any positions of any of the meat removing plates also shown in FIG. 13.

g) Then, by means of the meat removing device 216, a second meat removing movement is made from the second starting position 44 in the meat removing direction 38 away from the support device 6 along the bone 4 to a second end position 46 distanced further from the support device 206 than the first end position 44 as FIG. 13 shows, so that further meat is removed from the bone 4.

In an embodiment of the method, which may be dependent on the specific carcass leg part to be deboned, steps d), e), f), and g) are executed at least one further cycle (indicated by 'y' in FIG. 7), wherein for the purpose of the execution of step g) during a further cycle, the second end position is each time distanced further from the support device than the second end position of a preceding execution of step g). By doing so, the meat removing device thus gradually moves further downward during successive iterations, or, cycles, thereby removing meat from the bone in a highly controlled and robust manner.

The control system 220 is configured, for the purpose of the execution of a meat removing movement of a step c) or g), to cause a reduction of a force in the meat removing direction 38 exerted by the meat removing device 216, preferably at least by plates 222a and 222b thereof, on the meat of the leg when the meat removing device reaches a neck 47 of the bone 4. Also, a force in the direction of the bone by meat removing plates 222a and 222b may temporarily be reduced, which further assists in passing the neck of the bone.

Also, for the purpose of step c) and/or step g), the respective first and/or second meat removing movements are executed for a respective predetermined time.

During a meat removing movement of step g, which may be the second meat removing movement or a meat removing movement of a further cycle as described above, the extra front meat removing plate 229 is moved towards the bone, to the active position thereof, or, if the plate 229 is already in the active position, it is kept in the active position. For example, when the control system 220 reduces a force by plates 222a and 222b as mentioned above, the plate 229 partially takes over the meat removing action by plates 222a and 222b.

When the meat removing operation is finalized, all plates may be moved to their inactive positions and the bone 4 may be removed from the system 200.

Other variations to the disclosed embodiments can be understood and effected by those skilled in the art in practicing the claimed invention, from a study of the drawings, the disclosure, and the appended claims. The foregoing description provides embodiments of the invention by way of example only. The scope of the present invention is defined by the appended claims. One or more of the objects of the invention are achieved by the appended claims.

The invention claimed is:

1. A method of deboning of a carcass leg part of a four-legged slaughter animal, for removing meat from a bone of the carcass leg part,
   the method comprising the subsequent steps of:
   a) holding, by a support device, of the leg part by the lower end of the bone, or by a still lower part of the leg,
   b) moving a meat removing device into a pre-cut, towards the bone, to a first starting position of the meat removing device, which pre-cut is a cut made along the circumference of the bone at, or at least near, a lower end of the bone so as to sever muscle fibers,
   c) executing by means of the meat removing device a first meat removing movement from the first starting position in a meat removing direction away from the support device along the bone to a first end position so that meat is removed from the bone,
   d) moving the meat removing device away from the bone, wherein meat which is in contact with the meat removing device is forced away from the bone and severs further meat from the bone,
   e) moving the meat removing device in a reposition direction towards the support device,
   f) moving the meat removing device towards the bone to a second starting position,
   g) executing by means of the meat removing device a second meat removing movement from the second starting position in the meat removing direction away from the support device along the bone to a second end position distanced further from the support device than the first end position so that further meat is removed from the bone.

2. The method according to claim 1, wherein during at least a part of step d), a force in the meat removing direction is exerted on the meat by the meat removing device.

3. The method according to claim 1, wherein during at least a part of step d), the movement of the meat removing device is partially in the meat removing direction.

4. The method according to claim 1, wherein meat which is in contact with the meat removing device at least during step d) is engaged by one or more engaging elements on the meat removing device,
   wherein the one or more engaging elements comprise one or more of: an outer edge of the meat removing device which outer edge faces away from the bone;
   an inner edge of the meat removing device which inner edge faces the bone and protrudes from the meat removing device in the meat removing direction;
   one or more through holes; one or more protrusions; and a surface region having an increased roughness.

5. The method according to claim 1, wherein the meat removing device comprises at least one meat removing plate,
   wherein each of the at least one meat removing plate has a curved meat removing section so as to follow at least a part of a cross-sectional contour of the bone in use,
   wherein each of the plates is movable or pivotable about a pivot axis, between an inactive position and an active position,
   wherein during a meat removing movement at least three of the plates are put in the active position and
   wherein during a movement away from the bone those at least three plates are moved towards the inactive position.

6. The method according to claim 1, wherein the second starting position is distanced further away from the support device than the first starting position.

7. The method according to claim 1, wherein steps d), e), f), and g) execute at least one further cycle,
   wherein for the execution of step g) during a further cycle, the second end position is each time distanced further from the support device than the second end position of a preceding execution of step g).

8. The method according to claim 7, wherein during a meat removing movement of the meat removing device in the meat removing direction, a force in the meat removing direction exerted by the meat removing device on the meat of the leg is reduced when the meat removing device reaches a neck of the bone.

9. The method according to claim 1, wherein for step c), the meat removing device is moved, by a drive unit, in the meat removing direction, by means of applying a predetermined force or force profile on the meat removing device.

10. The method according to claim 1, wherein for the purpose of step c) and/or step g), the respective first and/or second meat removing movements are executed for a respective predetermined time.

11. A system for deboning a carcass leg part of a four-legged slaughter animal, for removing meat from a bone of the carcass leg part, in accordance with a method according to claim 1, the system comprising:

a support device, configured for holding the leg part by the lower end of the bone, or by a still lower part of the leg, a meat removing device for removing meat from the bone, and a control unit configured for in use of the system, successively:

causing the meat removing device to be moved into a pre-cut, towards the bone, to a first starting position, which pre-cut is a cut made along a circumference of the bone at, or at least near, a lower end of the bone so as to sever muscle fibers, causing the execution by means of the meat removing device of a first meat removing movement from the first starting position in a meat removing direction away from the support device along the bone to a first end position so that meat is removed from the bone, causing the meat removing device to be moved away from the bone, wherein meat which is in contact with the meat removing device is forced away from the bone and severs further meat from the bone, causing the meat removing device to be moved in a reposition direction towards the support device, causing the meat removing device to be moved towards the bone to a second starting position, and causing the execution by means of the meat removing device of a second meat removing movement from the second starting position in the meat removing direction away from the support device along the bone to a second end position distanced further from the support device than the first end position so that further meat is removed from the bone.

12. The system according to claim 11, wherein the meat removing device comprises at least one meat removing plate, each movable or pivotable about a pivot axis, between an inactive position and an active position, the plates in the active position being closer to the bone in use, the plates being positioned such that in use the bone is in between the plates at least in the active position, extending at least substantially perpendicular to a plane of the plates, and that during a movement of the meat removing device towards the bone, at least three of the at least one meat removing plate are brought in the active position so as to capture the bone in between respective meat removing sections of the at least three meat removing plates, wherein each respective meat removing plate has a curved meat removing section so as to follow at least a part of a cross-sectional contour of the bone in use.

13. The system according to claim 12, wherein the meat removing device comprises four meat removing plates in the form of one pair of meat removing plates being operable jointly, and two individually operable further meat removing plates.

14. The system according to claim 11, wherein at least two of the at least three meat removing plates comprises one or more engaging elements, wherein the one or more engaging elements comprise one or more of:

an outer edge of the meat removing device which outer edge faces away from the bone;

an inner edge of the meat removing device which inner edge faces the bone and protrudes from the meat removing device in the meat removing direction;

one or more through holes; one or more protrusions; and a surface region of increased roughness, which engaging elements in use are in contact with the meat during a meat removing movement, so that as a result meat is forced away from the bone and severs further meat from the bone as a result of the moving away from the bone of the meat removing device during the subsequent movement of the meat removing device away from the bone.

15. The system according to claim 11, wherein the control unit is configured, for the purpose of the execution of a meat removing movement, to cause a reduction of a force in the meat removing direction exerted by the meat removing device on the meat of the leg when the meat removing device reaches a neck of the bone.

\* \* \* \* \*